Patented Sept. 19, 1944

2,358,314

UNITED STATES PATENT OFFICE 2,358,314

DI-(DIHYDRONORDICYCLOPENTADIENYL)-ETHER

Herman A. Bruson, Philadelphia, Pa., assignor to The Resinous Products & Chemical Company, Philadelphia, Pa., a corporation of Delaware No Drawing. Application June 4, 1943,
Serial No. 489,699

4 Claims. (Cl. 260—611)

This invention relates to di-(dihydronordicyclopentadienyl) ether, a new substance, having the probable formula:

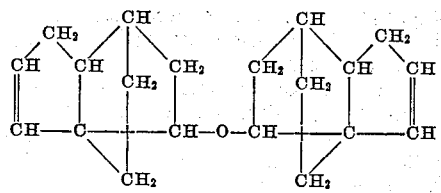

and to a method for its preparation.

This application is a continuation-in-part of copending applications Serial No. 442,188, filed May 8, 1942, and Serial No. 476,640, filed February 20, 1943.

According to this invention, di-(dihydronordicyclopentadienyl) ether is obtained by reacting dicyclopentadiene with hydroxydihydronordicyclopentadiene in the presence of acidic condensing agents. The reaction involves a simultaneous addition and molecular rearrangement apparently in accordance with the following equation:

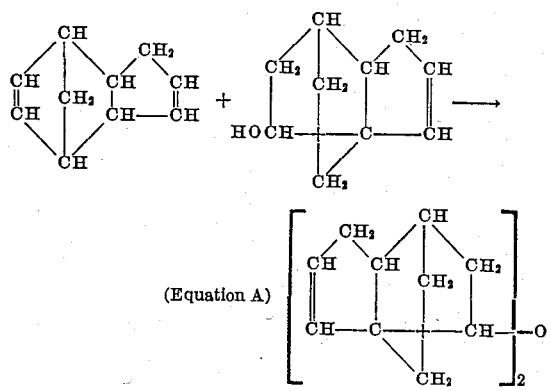

(Equation A)

The product is a high-boiling, doubly unsaturated ether useful as a plasticizer for synthetic rubber, polyvinyl chloride, nitrocellulose, cellulose ethers, and many other types of resins.

In practicing this invention, one may use pure or crude reactants, for example, purified dicyclopentadiene may be reacted with water in the presence of sulfuric acid so as to simultaneously hydrate and rearrange the dicyclopentadiene to hydroxydihydronordicyclopentadiene, essentially in accordance with the following equation:

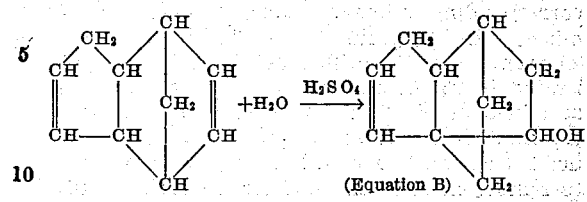

(Equation B)

The resulting product can be isolated as such and subsequently condensed with another mol of di-cyclopentadiene to yield di-(dihydronordicyclopentadienyl) ether.

Alternatively, the actual isolation of the hydroxydihydronordicyclopentadiene need not be carried out, and the crude hydration product may be reacted in one operation with dicyclopentadiene.

In place of pure dicyclopentadiene, there may be used the crude hydrocarbon mixtures containing upwarrds of 5% of dicyclopentadiene such as are obtained in the cracking of petroleum or the distillation of coal and which contain indene, styrene, xylenes, and other hydrocarbons. By way of example, there may be used a product obtained from the cracking of a Texas Panhandle oil, from which ethylene, butadiene, benzene, and toluene have been stripped. Such a product is available commercially under the name of "Dripolene" and is an oil containing about 25% of dicyclopentadiene.

It is surprising that only one double bond of the dicyclopentadiene molecule reacts to the complete exclusion of the other and without appreciable interference of the other unsaturates (indene, styrene, etc.) which may be present.

The condensation of the dicyclopentadiene with the hydroxydihydronordicyclopentadiene in accordance with Equation A above is catalyzed by acidic condensing agents such as sulfuric acid, sulfuric acid esters, such as ethyl acid sulfate, sulfonic acids such as toluene sulfonic acid or butyl sulfonic acid, strongly acidic metal salts, such as zinc chloride, or boron trifluoride and its coordination complexes with oxygenated compounds, including the complexes of boron trifluoride with ethers, carboxylic acid, alcohols, ketones, carboxylic esters, or water, which possess strongly acidic properties. Typical boron complexes are $BF_3 \cdot C_2H_5OC_2H_5$, $BF_3 \cdot C_4H_9OC_4H_9$, $BF_3 \cdot 2CH_3COOH$, $BF_3 \cdot 2C_4H_9OH$, $BF_3 \cdot CH_3COCH_3$, $BF_3 \cdot 2CH_3COOC_2H_5$, and $BF_3 \cdot (H_2O)_x$, where $x$ is one or two.

The amount of acidic condensing agent may vary from a few per cent. of the amount of reactants up to a mol equivalent thereof. The reaction may be initiated even at room temperature, but may be accelerated and carried to completion up to the temperature of decomposition of the dicyclopentadiene. A range of about 50° C. to about 125° C. is preferred. When the reaction has been carried out, the acidic catalyst should be removed by washing or neutralization. The product may then be purified as desired.

The following examples illustrate this invention:

Example 1

A mixture of 132 grams (1 mol) of dicyclopentadiene and 400 grams of aqueous 25% sulfuric acid is stirred rapidly and boiled under reflux at 105°-108° C. for four and one-half hours. The hot mixture is allowed to stand, and the lower aqueous sulfuric acid layer is drawn off. The upper oil layer, containing hydroxydihydronordicyclopentadiene together with some of the corresponding ether and dicyclopentadiene, is mixed with 132 grams of dicyclopentadiene and 25 grams of 98% sulfuric acid and is gradually heated to 95° C. during the course of one hour and held at 95° C. for two hours longer while the mixture is stirred continuously. The product is then washed with hot water several times to remove most of the sulfuric acid and, finally, with sodium carbonate or sodium hydroxide solution followed by a water wash to effectively remove all acidity. The dark viscous oil obtained is then distilled in vacuo.

Di-(dihydronordicyclopentadienyl) ether distils over at 195°-205° C./5 mm. as a somewhat viscid, pale yellow oil. The yield is 130-140 grams.

Example 2

A mixture of 132 grams of dicyclopentadiene and 150 grams of hydroxydihydronordicyclopentadiene is heated to 70° C. and stirred while 15 grams of boron trifluoride-diethyl ether complex, $BF_3 \cdot O(C_2H_5)_2$, is added dropwise. The mixture is then stirred for six hours at 70° C. It is worked up by washing with hot water, neutralizing traces of acidity with soda, and distilling in vacuo. The resulting di(dihydronordicyclopentadienyl) ether distils over at 180°-185° C./2 mm. as a faintly yellow oil. The yield is 108 grams. Upon redistillation, it comes over as a colorless liquid boiling at 185°-188° C./3 mm. and having the following constants: $N_D^{25}$ 1.5372; $D_4^{25}$ 1.077; iodine number, 185.

Upon catalytic hydrogenation of each of the two double bonds present, the saturated compound having the probable formula:

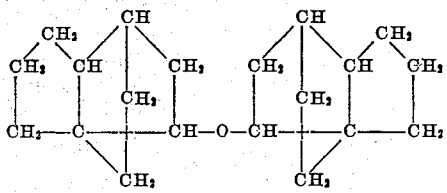

is obtained as a waxy crystalline mass which, after recrystallization from 1-nitropropane, forms colorless needles melting at 60° C.

I claim:

1. As a new compound, di-(dihydronordicyclopentadienyl) ether, said compound, when pure, consisting of a colorless liquid which boils at 185°-188° C./3 mm.

2. A method for preparing di(dihydronordicyclopentadienyl) ether which comprises reacting dicyclopentadiene with hydroxydihydronordicyclopentadiene in the presence of an acidic condensing agent.

3. A method for preparing di-(dihydronordicyclopentadienyl) ether which comprises reacting dicyclopentadiene with hydroxydihydronordicyclopentadiene in the presence of sulfuric acid.

4. A method for preparing di-(dihydronordicyclopentadienyl) ether which comprises reacting dicyclopentadiene with hydroxydihydronordicyclopentadiene in the presence of a boron trifluoride catalyst.

HERMAN A. BRUSON.